United States Patent
Shibasaki (10) Patent No.: US 11,615,564 B2
(45) Date of Patent: Mar. 28, 2023

(54) TIME SERIES DATA DISPLAY DEVICE

(71) Applicant: Fanuc Corporation, Yamanashi (JP)

(72) Inventor: Yasuhiro Shibasaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/904,027

(22) Filed: Jun. 17, 2020

(65) Prior Publication Data

US 2020/0402277 A1    Dec. 24, 2020

(30) Foreign Application Priority Data

Jun. 19, 2019   (JP) .............................. JP2019-113903

(51) Int. Cl.
*G06T 11/20* (2006.01)
*G06T 11/60* (2006.01)
*G06F 16/22* (2019.01)

(52) U.S. Cl.
CPC ............ *G06T 11/206* (2013.01); *G06F 16/22* (2019.01); *G06T 11/60* (2013.01)

(58) Field of Classification Search
CPC ........ G06T 11/206; G06T 11/60; G06F 16/22; G06K 9/00671; G05B 15/02
See application file for complete search history.

(56) References Cited

U.S. PATENT DOCUMENTS

| | | | | |
|---|---|---|---|---|
| 5,483,468 A | * | 1/1996 | Chen ................... | H04L 41/0803 714/E11.181 |
| 5,623,598 A | * | 4/1997 | Voigt ..................... | G06F 11/34 702/182 |
| 5,791,332 A | * | 8/1998 | Thompson .............. | F23N 3/082 126/116 A |
| 6,031,633 A | * | 2/2000 | Andoh ................. | H04N 1/1052 358/421 |
| 7,082,932 B1 | * | 8/2006 | Crane ..................... | F02D 23/00 123/561 |
| 8,842,119 B2 | * | 9/2014 | Hubbard ............. | G06F 11/3055 345/440.2 |
| 9,124,488 B2 | * | 9/2015 | Wong ..................... | G06T 11/206 |
| 9,208,050 B2 | * | 12/2015 | Medhi ................. | G06F 3/04842 |

(Continued)

FOREIGN PATENT DOCUMENTS

| | | |
|---|---|---|
| JP | 2003162504 A | 6/2003 |
| JP | 2004198148 A | 7/2004 |

(Continued)

OTHER PUBLICATIONS

Japanese Notice of Reasons for Refusal for Japanese Application No. 2019-113903, dated Jan. 31, 2023 with translation, 9 pages.

*Primary Examiner* — Charles L Beard
(74) *Attorney, Agent, or Firm* — RatnerPrestia (57) ABSTRACT

A time series data display device includes a display unit that outputs display data regarding the time series data. The display unit includes a general display generation unit that generates general display data for general display of a general tendency of the time series data and a detailed display generation unit that generates detailed display data for detailed display of detailed individual values of the time series data. The general display displays frequency or density of individual data configuring the time series data at each position of the time series data on a rendering plane, with a visual effect in accordance with the frequency or the density.

10 Claims, 10 Drawing Sheets

(56) References Cited

U.S. PATENT DOCUMENTS

| | | | | |
|---|---|---|---|---|
| 9,363,148 | B2* | 6/2016 | Somaiya | H04L 43/20 |
| 9,446,769 | B2* | 9/2016 | Yun | B60W 50/14 |
| 9,463,574 | B2* | 10/2016 | Purkayastha | G05D 1/0088 |
| 9,472,002 | B1* | 10/2016 | Wong | G06F 11/328 |
| 9,619,529 | B2* | 4/2017 | Peacock | G06F 16/248 |
| 9,621,368 | B2* | 4/2017 | Jin | G06T 11/001 |
| 10,091,358 | B1* | 10/2018 | Molander | G06T 11/206 |
| 10,109,086 | B1* | 10/2018 | Bakshi | G06T 11/206 |
| 10,169,890 | B1* | 1/2019 | Bakshi | G06F 40/14 |
| 10,468,128 | B2* | 11/2019 | Davies | G16H 15/00 |
| 10,496,658 | B2* | 12/2019 | Smith | G06F 16/248 |
| 10,521,331 | B1* | 12/2019 | Damodaran | G06F 16/24558 |
| 10,534,791 | B1* | 1/2020 | Block | G06F 16/951 |
| 10,657,477 | B2* | 5/2020 | Kudo | G06Q 10/0633 |
| 11,107,284 | B2* | 8/2021 | Deck | H04L 67/18 |
| 11,240,126 | B2* | 2/2022 | Makwarth | H04L 41/5009 |
| 11,316,749 | B1* | 4/2022 | Werner | H04L 41/12 |
| 2002/0169601 | A1* | 11/2002 | Nishio | G10L 19/032 704/205 |
| 2002/0190683 | A1* | 12/2002 | Karikomi | G05D 19/02 318/632 |
| 2003/0020431 | A1* | 1/2003 | Kiuchi | H02P 21/06 318/779 |
| 2003/0088400 | A1* | 5/2003 | Nishio | G10L 21/038 704/201 |
| 2003/0101261 | A1 | 5/2003 | Ikeda et al. | |
| 2003/0128212 | A1* | 7/2003 | Pitkow | G06T 11/206 345/440 |
| 2005/0068320 | A1* | 3/2005 | Jaeger | G06T 11/206 345/440 |
| 2005/0174482 | A1* | 8/2005 | Yamada | H04N 9/12 345/1.3 |
| 2005/0177042 | A1* | 8/2005 | Abe | A61B 5/055 600/431 |
| 2006/0036425 | A1* | 2/2006 | Le Cocq | G06T 11/206 703/22 |
| 2007/0035650 | A1* | 2/2007 | Suzuki | H04N 5/232411 348/E5.042 |
| 2008/0089590 | A1* | 4/2008 | Isomura | G06T 11/60 |
| 2008/0089592 | A1* | 4/2008 | Isomura | H04N 1/00196 382/224 |
| 2008/0192056 | A1* | 8/2008 | Robertson | G06T 11/206 345/440 |
| 2008/0306636 | A1* | 12/2008 | Caspe-Detzer | F02B 77/084 701/1 |
| 2008/0313006 | A1* | 12/2008 | Witter | G01F 13/006 705/7.17 |
| 2009/0224719 | A1* | 9/2009 | Shimada | H02P 8/14 318/696 |
| 2010/0030500 | A1* | 2/2010 | Refai-Ahmed | G06F 1/3203 702/64 |
| 2010/0078267 | A1* | 4/2010 | Hashimoto | B66B 1/302 187/289 |
| 2010/0115443 | A1* | 5/2010 | Richstein | G06F 11/0706 715/771 |
| 2010/0156666 | A1* | 6/2010 | Choi | H04L 12/2827 340/870.07 |
| 2010/0191487 | A1* | 7/2010 | Rada | H02J 3/01 707/E17.014 |
| 2010/0192907 | A1* | 8/2010 | Stemler | F02D 41/0205 701/102 |
| 2010/0246456 | A1* | 9/2010 | Suo | H04B 7/2656 370/336 |
| 2011/0015813 | A1* | 1/2011 | Munukur | B60W 30/20 180/65.21 |
| 2011/0041087 | A1* | 2/2011 | Leveille | G06T 11/206 715/765 |
| 2011/0084967 | A1* | 4/2011 | De Pauw | G06F 3/0481 715/830 |
| 2011/0106589 | A1* | 5/2011 | Blomberg | G06T 11/206 705/347 |
| 2011/0118077 | A1* | 5/2011 | Kawasaki | B60W 30/1882 477/3 |
| 2011/0141103 | A1* | 6/2011 | Cohen | G06T 19/00 345/419 |
| 2011/0156622 | A1* | 6/2011 | Galbiati | H02P 6/085 318/400.2 |
| 2011/0166839 | A1* | 7/2011 | Smith | G01R 21/133 703/2 |
| 2011/0208369 | A1* | 8/2011 | Yang | H02J 3/14 700/296 |
| 2012/0016528 | A1* | 1/2012 | Raman | G06F 9/5094 709/219 |
| 2012/0102396 | A1* | 4/2012 | Arksey | G06T 11/206 715/273 |
| 2012/0116689 | A1* | 5/2012 | Heinje | G16C 20/70 702/25 |
| 2012/0120078 | A1* | 5/2012 | Hubbard | G06F 11/3055 345/440.2 |
| 2012/0265525 | A1* | 10/2012 | Moriya | G10L 19/032 704/211 |
| 2012/0268286 | A1* | 10/2012 | Jin | G06F 3/0481 340/815.4 |
| 2012/0306886 | A1* | 12/2012 | Bernard | G01R 13/029 345/440.1 |
| 2012/0311475 | A1* | 12/2012 | Wong | G06F 11/328 715/772 |
| 2012/0313949 | A1* | 12/2012 | Rope | G06F 16/9038 345/440 |
| 2013/0100154 | A1* | 4/2013 | Woodings | G01R 13/029 345/589 |
| 2013/0129255 | A1* | 5/2013 | Homma | A61B 6/487 382/294 |
| 2013/0249917 | A1* | 9/2013 | Fanning | G06F 11/323 345/440 |
| 2013/0271049 | A1* | 10/2013 | Iwashita | H03M 3/324 318/400.05 |
| 2013/0300747 | A1* | 11/2013 | Wong | G06T 11/206 345/440.2 |
| 2014/0078151 | A1* | 3/2014 | Garr | G05B 15/02 345/440.2 |
| 2014/0176036 | A1* | 6/2014 | Hagihara | H02P 23/12 318/615 |
| 2014/0215512 | A1* | 7/2014 | Maruyama | H04N 21/8133 725/34 |
| 2014/0240314 | A1* | 8/2014 | Fukazawa | G06T 15/00 345/419 |
| 2014/0282175 | A1* | 9/2014 | Smith | G06F 16/248 715/771 |
| 2014/0282176 | A1* | 9/2014 | Peacock | G06F 16/248 715/771 |
| 2014/0306640 | A1* | 10/2014 | Yamamoto | H02P 27/08 318/504 |
| 2015/0002513 | A1* | 1/2015 | Cilibrasi | A61B 5/1118 345/440 |
| 2015/0006004 | A1* | 1/2015 | Yamamoto | B60W 20/10 903/902 |
| 2015/0029183 | A1* | 1/2015 | Chiu | G06T 19/006 345/419 |
| 2015/0029213 | A1* | 1/2015 | Benson | G06T 11/206 345/440.2 |
| 2015/0054830 | A1* | 2/2015 | Inuzuka | G06T 11/206 345/440 |
| 2015/0193094 | A1* | 7/2015 | Armitage | G06F 3/04855 715/825 |
| 2015/0229532 | A1* | 8/2015 | Somaiya | H04L 41/40 715/736 |
| 2015/0237085 | A1* | 8/2015 | Duncker | G06Q 30/0601 715/753 |
| 2015/0315766 | A1* | 11/2015 | Take | E02F 9/20 180/65.265 |
| 2015/0356786 | A1* | 12/2015 | Bare | G01R 31/3274 345/633 |
| 2016/0010494 | A1* | 1/2016 | Erlund | G01H 1/10 60/773 |
| 2016/0021727 | A1* | 1/2016 | Nagai | G16H 30/40 378/98 |

(56) References Cited

U.S. PATENT DOCUMENTS

| | | | | |
|---|---|---|---|---|
| 2016/0068078 A1* | 3/2016 | Osamura | B60L 15/20 | 701/22 |
| 2016/0070430 A1* | 3/2016 | Kim | G06T 11/206 | 715/769 |
| 2016/0071319 A1* | 3/2016 | Fallon | G06F 3/005 | 345/633 |
| 2016/0098848 A1* | 4/2016 | Zamanakos | A61B 5/7275 | 345/440 |
| 2016/0139604 A1* | 5/2016 | Ito | H02K 11/25 | 318/601 |
| 2016/0180556 A1* | 6/2016 | Deng | G06T 11/206 | 345/440 |
| 2016/0224123 A1* | 8/2016 | Antoniac | G06F 3/04815 | |
| 2016/0225171 A1* | 8/2016 | Lentz | G06T 11/206 | |
| 2016/0253828 A1* | 9/2016 | Nishimura | G06T 11/206 | 345/592 |
| 2016/0292920 A1* | 10/2016 | Sprock | G06T 13/20 | |
| 2016/0307344 A1* | 10/2016 | Monnier | G06F 3/04883 | |
| 2016/0328883 A1* | 11/2016 | Parfenov | G06T 19/006 | |
| 2016/0350950 A1* | 12/2016 | Ritchie | G06F 40/18 | |
| 2016/0358352 A1* | 12/2016 | Kuroda | G06T 11/206 | |
| 2017/0014090 A1* | 1/2017 | Tsugo | G16H 40/63 | |
| 2017/0017209 A1* | 1/2017 | Yamamoto | H02P 29/025 | |
| 2017/0050640 A1* | 2/2017 | Toyokawa | F16H 63/502 | |
| 2017/0124736 A1* | 5/2017 | Bresser | G09G 5/00 | |
| 2017/0140244 A1* | 5/2017 | Sharma | G06T 11/206 | |
| 2017/0154283 A1* | 6/2017 | Kawai | G06F 11/006 | |
| 2017/0177940 A1* | 6/2017 | Jin | G06T 11/001 | |
| 2017/0200294 A1* | 7/2017 | Hirano | G09G 5/14 | |
| 2017/0206417 A1* | 7/2017 | Aoyama | H04N 5/272 | |
| 2017/0213235 A1* | 7/2017 | Lautenberg | G06Q 30/0255 | |
| 2017/0371523 A1* | 12/2017 | Liao | G06F 3/04815 | |
| 2018/0021024 A1* | 1/2018 | Fukuda | G06T 7/11 | 382/131 |
| 2018/0052755 A1* | 2/2018 | Suzuki | G06F 11/3419 | |
| 2018/0085048 A1* | 3/2018 | Lee | G06F 3/0483 | |
| 2018/0088753 A1* | 3/2018 | Viégas | G06F 16/248 | |
| 2018/0137667 A1* | 5/2018 | Kindelsberger | G06T 11/206 | |
| 2018/0165844 A1* | 6/2018 | Kirichenko | G06T 11/206 | |
| 2018/0224841 A1* | 8/2018 | Tani | G05B 23/0259 | |
| 2018/0259944 A1* | 9/2018 | Oka | G05B 19/418 | |
| 2018/0275941 A1* | 9/2018 | Umeda | G06F 16/904 | |
| 2018/0296108 A1* | 10/2018 | Stewart | A61B 5/349 | |
| 2018/0331642 A1* | 11/2018 | Magini | H02P 9/08 | |
| 2018/0335896 A1* | 11/2018 | Vernon | G06F 3/04847 | |
| 2019/0012553 A1* | 1/2019 | Maruchi | G06K 9/6282 | |
| 2019/0065014 A1* | 2/2019 | Richter | G06T 11/60 | |
| 2019/0080699 A1* | 3/2019 | Togawa | G06T 11/206 | |
| 2019/0112745 A1* | 4/2019 | Chai | D06F 37/36 | |
| 2019/0129607 A1* | 5/2019 | Saurabh | G06F 3/011 | |
| 2019/0166442 A1* | 5/2019 | Kishi | G10L 25/18 | |
| 2019/0178705 A1* | 6/2019 | Kishi | G01H 3/08 | |
| 2019/0205486 A1* | 7/2019 | Santarone | H04W 4/029 | |
| 2019/0253018 A1* | 8/2019 | Tanaka | G05B 19/406 | |
| 2019/0299967 A1* | 10/2019 | Fujiwara | B60W 50/00 | |
| 2019/0357269 A1* | 11/2019 | Wu | H04W 24/08 | |
| 2020/0019595 A1* | 1/2020 | Azua Garcia | G06T 11/206 | |
| 2020/0027314 A1* | 1/2020 | Pilnock | G07F 17/3288 | |
| 2020/0034622 A1* | 1/2020 | Thakurta | G06V 40/20 | |
| 2020/0081045 A1* | 3/2020 | Neuenschwander | G06Q 50/06 | |
| 2020/0105388 A1* | 4/2020 | Kano | G16H 10/40 | |
| 2020/0110394 A1 | 4/2020 | Hirata | | |
| 2020/0112380 A1* | 4/2020 | Begley | G01R 31/2832 | |
| 2020/0254670 A1* | 8/2020 | Horiuchi | G06N 3/0454 | |
| 2020/0254671 A1* | 8/2020 | Horiuchi | G06N 20/00 | |
| 2020/0387127 A1* | 12/2020 | McGill | G05B 19/0423 | |
| 2021/0015459 A1* | 1/2021 | Miyachi | A61B 8/4472 | |
| 2021/0027458 A1* | 1/2021 | Chor | H04L 67/38 | |
| 2021/0031746 A1* | 2/2021 | Tabata | B60K 6/445 | |
| 2021/0042525 A1* | 2/2021 | Secretin | G06V 20/20 | |
| 2021/0067924 A1* | 3/2021 | Begley | H02J 13/00022 | |
| 2021/0118342 A1* | 4/2021 | Chen | G06T 19/006 | |
| 2021/0132743 A1* | 5/2021 | Vernon | G06F 3/04847 | |
| 2021/0134032 A1* | 5/2021 | Watanabe | G06T 7/0004 | |
| 2021/0149359 A1* | 5/2021 | Mehrotra | G05B 19/41885 | |
| 2021/0149889 A1* | 5/2021 | Mehrotra | G06F 16/248 | |
| 2021/0150438 A1* | 5/2021 | Mehrotra | G06Q 10/06 | |
| 2021/0174086 A1* | 6/2021 | Cunningham | G01D 3/08 | |
| 2021/0217156 A1* | 7/2021 | Balachandran | G01G 23/3735 | |
| 2021/0248167 A1* | 8/2021 | Nadler | G06F 3/0481 | |
| 2021/0274545 A1* | 9/2021 | Adjakple | H04W 28/0268 | |
| 2021/0359775 A1* | 11/2021 | Ohtsuji | H04W 16/18 | |
| 2021/0404914 A1* | 12/2021 | Shimobeppu | G06N 3/08 | |
| 2022/0051457 A1* | 2/2022 | Schneider | G06T 11/206 | |
| 2022/0092696 A1* | 3/2022 | Dani | G06Q 40/06 | |
| 2022/0108501 A1* | 4/2022 | Kanada | G06T 11/001 | |
| 2022/0147307 A1* | 5/2022 | Maezawa | G06K 9/00523 | |

FOREIGN PATENT DOCUMENTS

| | | |
|---|---|---|
| WO | 2014030256 A1 | 2/2014 |
| WO | 2018235807 A1 | 12/2018 |
| WO | 2019102654 A1 | 5/2019 |

\* cited by examiner

DISPLAY IN SCATTER DIAGRAM ⬇ ⬆ DISPLAY IN FREQUENCY GRAPH

DISPLAY IN LINE GRAPH

TIME SERIES DATA DISPLAY DEVICE

RELATED APPLICATIONS

The present application claims priority to Japanese Patent Application Number 2019-113903 filed Jun. 19, 2019, the disclosure of which is hereby incorporated by reference herein in its entirety.

BACKGROUND OF THE INVENTION

1. Field of the Invention

The present invention relates to time series data display devices and, in particular, to a time series data display device allowing a distribution of time series data detected in an industrial machine to be easily grasped.

2. Description of the Related Art

At manufacturing sites such as factories, a plurality of industrial machines such as processing machines and machine tools are set and operating. At a manufacturing site, data regarding operations of the plurality of industrial machines is collected, and the collected data is analyzed. With this, the operating status of each industrial machine is monitored (for example, Japanese Patent Laid-Open Publication No. 2004-198148).

Data regarding operations of industrial machines includes static data changing by settings, such as the maximum speed of the axis or time constant. Also, the data regarding operations of industrial machines includes time series data changing over time, such as a moving speed of the axis and a current value. To monitor the operating status of the industrial machine, changes of time series data are intensively analyzed.

To analyze the time series data, means may be taken in which the time series data is visualized and displayed on a screen or the like so as to be easily and intuitively grasped by an operator. To visualize the time series data, line display of the time series data may be made for each data item. Also as required, a plurality of data items may be selected by the operator, and the time series data of the selected data items may be on superposing display.

The time series data acquired from the industrial machine may be time series data acquired over a long period of time. Also, the time series data may be data acquired irregularly (for example, the data has a temporal data loss or data acquisition timing is unbalanced in time). Moreover, the time series data acquired at the time of operation of the industrial machine may be split into data acquired in a plurality of different modes.

Figure 10:
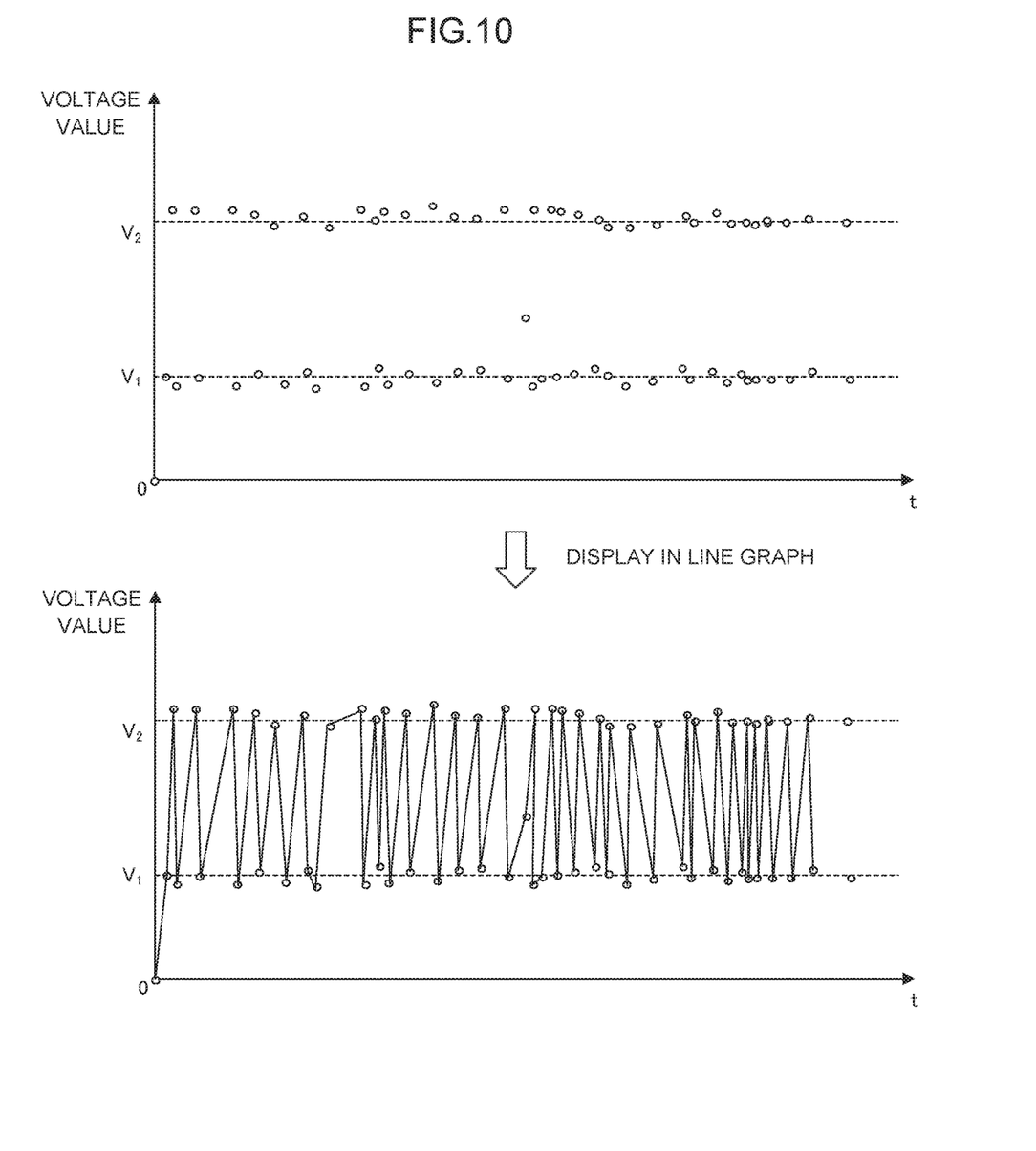
FIG. 10 is a diagram of an example of display of time series data according to a prior art technique.

FIG. 10 depicts an example of time series data acquired in a plurality of different modes of an industrial machine. In the industrial machine described herein, switching between two operation modes is repeatedly performed during operation. Also, the industrial machine is controlled at a voltage value V1 in a first operation mode and a voltage value V2 in a second operation mode. In this case, as exemplarily depicted in FIG. 10, voltage values near two voltage values V1 and V2 are alternately detected repeatedly. These detected voltage values are acquired as time series data. When this data is displayed in a line graph, which is a general method of displaying time series data, as depicted on a lower side of FIG. 10, the graph has points indicating voltage values near two voltage values V1 and V2 being connected by many lines. Thus, it is difficult to grasp the condition of distribution of voltage values near each of the voltage values V1 and V2. Moreover, a problem arises in which an outlier or the like is hidden behind a line to become unrecognizable on a screen. Still further, when time series data having data acquired over a long period of time being unbalanced in time is displayed in a line graph, there is another problem in which it is difficult to grasp a change point of data for each operation mode.

Yet still further, when a plurality of pieces of time series data are on superposing display, still another problem arises in which lines each indicating a change of the time series data overlap one another and the distribution as a whole is difficult to be grasped.

Thus, a data visualization scheme allowing the operator at a manufacturing site to easily grasp a distribution of values of time series data has been desired.

SUMMARY OF THE INVENTION

A time series data display device according to one aspect of the present invention solves the above-described problems by calculating the frequency of detection values of time series data for color-coded display.

One aspect of the present invention is a time series data display device that displays time series data. The time series data display device includes a display unit that outputs display data regarding the time series data. The display unit includes a general display generation unit that generates general display data for general display of a general tendency of the time series data and a detailed display generation unit that generates detailed display data for detailed display of detailed individual values of the time series data. The general display displays frequency or density of individual data configuring the time series data at each position of the time series data on a rendering plane, with a visual effect in accordance with the frequency or the density.

According to one aspect of the present invention, even if observation target data is split into data acquired in a plurality of modes, behaviors of the observation target can be visualized. Also, even if data unbalanced in time is acquired over a long period of time, a data change point can be appropriately grasped.

BRIEF DESCRIPTION OF THE DRAWINGS

Objects and features of the present invention will become apparent from description of the following embodiments with reference to the attached drawings. In these drawings.

DETAILED DESCRIPTION OF THE PREFERRED EMBODIMENTS

In the following, embodiments of the present invention are described with reference to the drawings.

Figure 1:
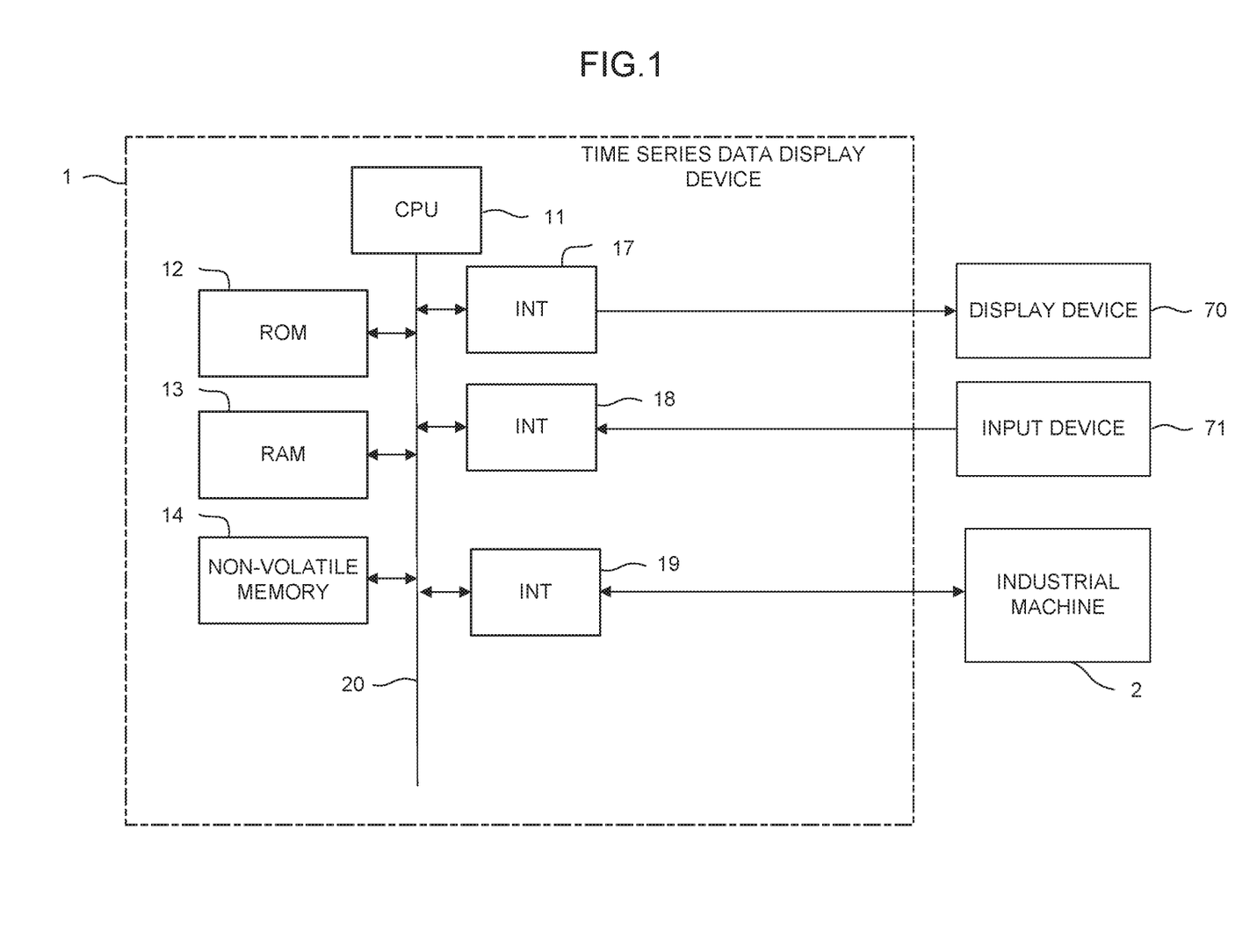
FIG. 1 is a schematic diagram of a hardware structure of a time series data display device according to one embodiment.

FIG. 1 is a schematic diagram of a hardware structure of a time series data display device according to one embodiment of the present invention. A time series data display device 1 can be implemented on, for example, a control device for controlling an industrial machine. The time series data display device 1 can also be implemented on a personal computer provided together with an industrial machine including a control device. Furthermore, the time series data display device 1 can be implemented as a computer, such as an edge computer, fog computer, or cloud server, connected to a control device via a wired/wireless network. In the present embodiment, an example is described in which the time series data display device 1 is implemented on a personal computer provided together with an industrial machine 2.

A central processing unit (CPU) 11 included in the time series data display device 1 according to the present embodiment is a processor for controlling the time series data display device 1 as a whole. The CPU 11 reads a system program stored in a read only memory (ROM) 12 via a bus 20. The CPU 11 controls the entire time series data display device 1 by following the system program. In a random access memory (RAM) 13, temporary calculation data, display data, various data input from outside, and so forth are temporarily stored.

A non-volatile memory 14 includes a memory backed up by a battery not depicted, a floppy disk drive (FDD), hard disk drive (HDD), solid state drive (SSD), and so forth. In the non-volatile memory 14, a storage state is retained even if the time series data display device 1 is powered off. In the non-volatile memory 14, a numerical control (NC) program read from an external device via an interface not depicted is stored. In the non-volatile memory 14, the NC program input via an input device 71, time series data acquired from the industrial machine, and so forth are stored. The NC program and various data stored in the non-volatile memory 14 may be loaded in the RAM 13 when executed or used. In the ROM 12, various system programs such as a known analysis program are written in advance.

On a display device 70, data read onto memory, data acquired as a result of executing a program and so forth, data acquired from the industrial machine, and so forth are output via an interface 17 for display. The input device 71 includes a keyboard, a pointing device, a voice input device, a gesture input device, and so forth. Upon reception of an instruction based on operation by an operator, transfer data from another external device, and so forth, the input device 71 passes the received data to the CPU 11 via an interface 18.

The time series data display device 1 is connected to the industrial machine 2 via an interface 19. The time series data display device 1 acquires the position, speed, and acceleration of an axis included in the industrial machine 2. The time series data display device 1 acquires current values and voltage values of a motor and so forth included in the industrial machine 2. The time series data display device 1 acquires detection values and so forth detected by a sensor provided to the industrial machine 2. The time series data display device 1 can store the acquired data in the non-volatile memory 14 as time series data, which is a data series associated with time or the like.

Figure 2:
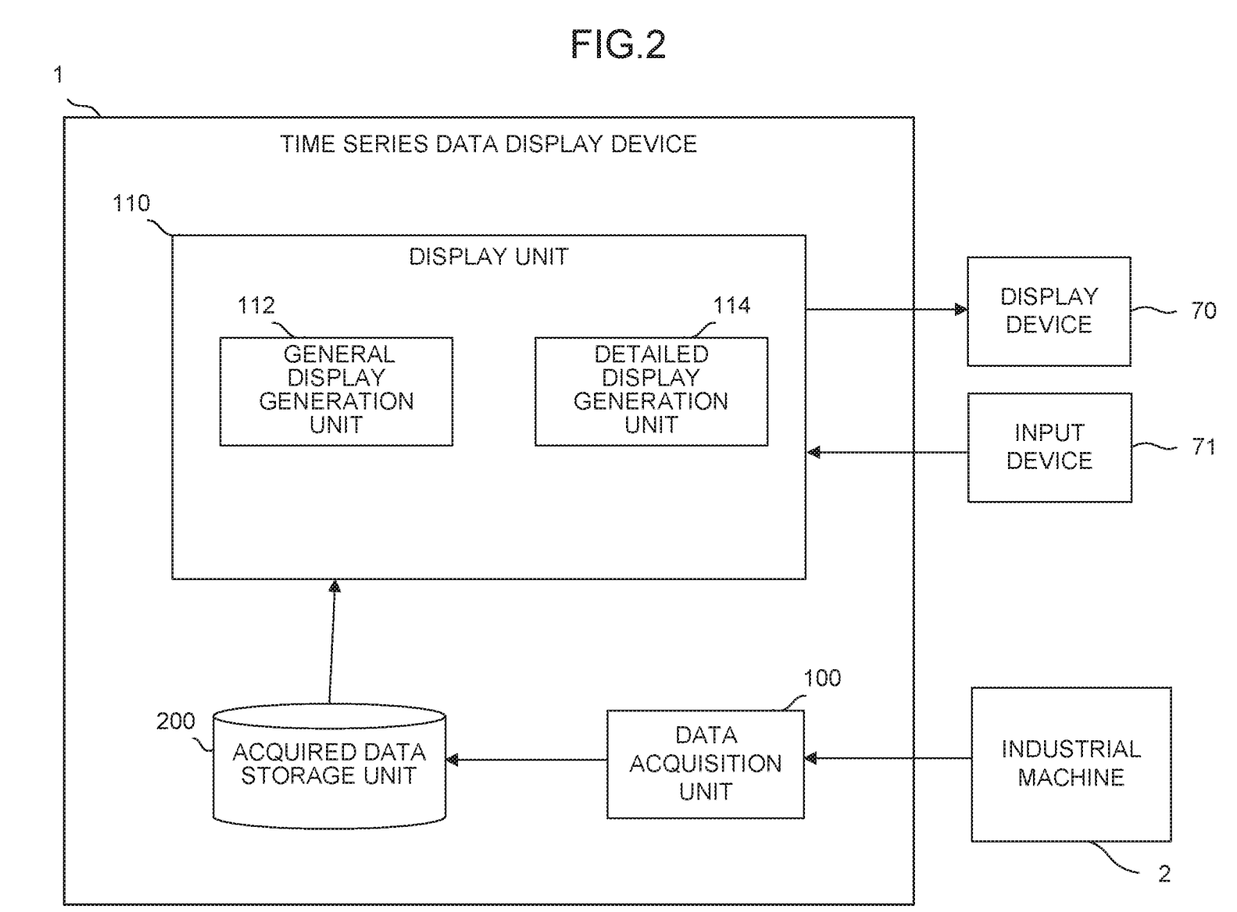
FIG. 2 is a schematic functional block diagram of a time series data display device according to a first embodiment.

FIG. 2 is a schematic functional block diagram of the time series data display device 1 according to a first embodiment of the present invention. Each function of the functional blocks depicted in FIG. 2 is achieved by the CPU 11 depicted in FIG. 1 executing a system program to control the operation of each unit of the time series data display device 1.

The time series data display device 1 includes a data acquisition unit 100 and a display unit 110. Also, in the non-volatile memory 14 of the time series data display device 1, an acquired data storage unit 200 is provided in advance, which is an area for storing data acquired by the data acquisition unit 100.

The data acquisition unit 100 is achieved by the CPU 11 executing the system program read from the ROM 12 and mainly performing input/output processing using the RAM 13, the non-volatile memory 14, and the interface 19, and so forth. The data acquisition unit 100 acquires various data detected in the industrial machine 2 and stores the acquired data in the acquired data storage unit 200. The data acquisition unit 100 acquires, for example, time series data of the position, speed, and acceleration of the axis acquired from the sensor provided to the industrial machine 2. The data acquisition unit 100 acquires time series data of current values, voltage values, and torque values of the motor. The data acquisition unit 100 acquires time series data of temperature data, voice data, moving image data, hardness data, moisture data, and so forth for each unit, and others. The data acquisition unit 100 stores these pieces of data as acquired data in the acquired data storage unit 200. The data acquisition unit 100 may acquire data from an external device or another device not depicted via the wired/wireless network. Also, the data acquisition unit 100 may acquire data output from a sensor data preprocessing device, a machine learning device, or the like not depicted.

The display unit 110 is achieved by the CPU 11 executing the system program read from the ROM 12 and mainly performing arithmetic processing using the RAM 13 and the non-volatile memory 14, input/output processing using the interfaces 17 and 18, and so forth. The display unit 110 conducts a statistical analysis on the acquired data stored in the acquired data storage unit 200. The display unit 110 generates display data regarding the analysis results, and displays this display data on the display device 70. The display unit 110 includes a general display generation unit 112 that generates general display data for general display of a general tendency of the acquired data. The general tendency is, for example, a rough tendency of a frequency distribution indicated by the acquired data. Also, the general display is a display mode for enabling the operator to grasp the general tendency. The display unit 110 includes a detailed display generation unit 114 that generates detailed display data for detailed display of detailed individual values of the acquired data. The detailed individual values refer to the respective values of the acquired data. The detailed display is a display mode for display so that each of these values can be grasped by the operator. In accordance with operation by the operator from the input device 71, the environmental state such as screen continuous display time, and so forth, the display unit 110 switches between the general display data generated by the general display generation unit 112 and the detailed display data generated by the detailed display generation unit 114 for display on the display device 70.

For the time series data included in the acquired data, the general display generation unit 112 calculates, as a frequency, the number of pieces of individual data configuring the time series data near each position on a rendering plane (data value-time plane) of the time series data. The general display generation unit 112 generates general display data based on the calculated frequency. The general display generation unit 112 calculates, for example, a frequency of a predetermined value $x_j$ at a predetermined time $t_i$. The frequency $f_{ij}$ refers to the number of pieces of data taking values from $(x_j-\Delta x)$ to $(x_j+\Delta x)$ in a range from $(t_i-\Delta t)$ to $(t_i+\Delta t)$. $\Delta t$ represents a predetermined duration set in advance, and $\Delta x$ represents a predetermined data value range set in advance.

Meanwhile, for the time series data included in the acquired data, the detailed display generation unit 114 generates detailed display data for detail display so that the operator can grasp individual data configuring the time series data. An example of the detailed display data is a scatter diagram regarding each piece of data configuring the time series data. Another example of the detailed display data is a list display regarding each piece of data configuring the time series data. The detailed display generation unit 114 may generate detailed display data of any form that allows each piece of data configuring the time series data to be grasped. Also, the detailed display generation unit 114 may generate detailed display data about data in a predetermined range. For example, when the operator operates the screen of the input device 71 with general display to make an instruction for detailed display in a predetermined range in the general display, the detailed display generation unit 114 may generate detailed display data for detailed display of the relevant range as being enlarged.

Figure 3:
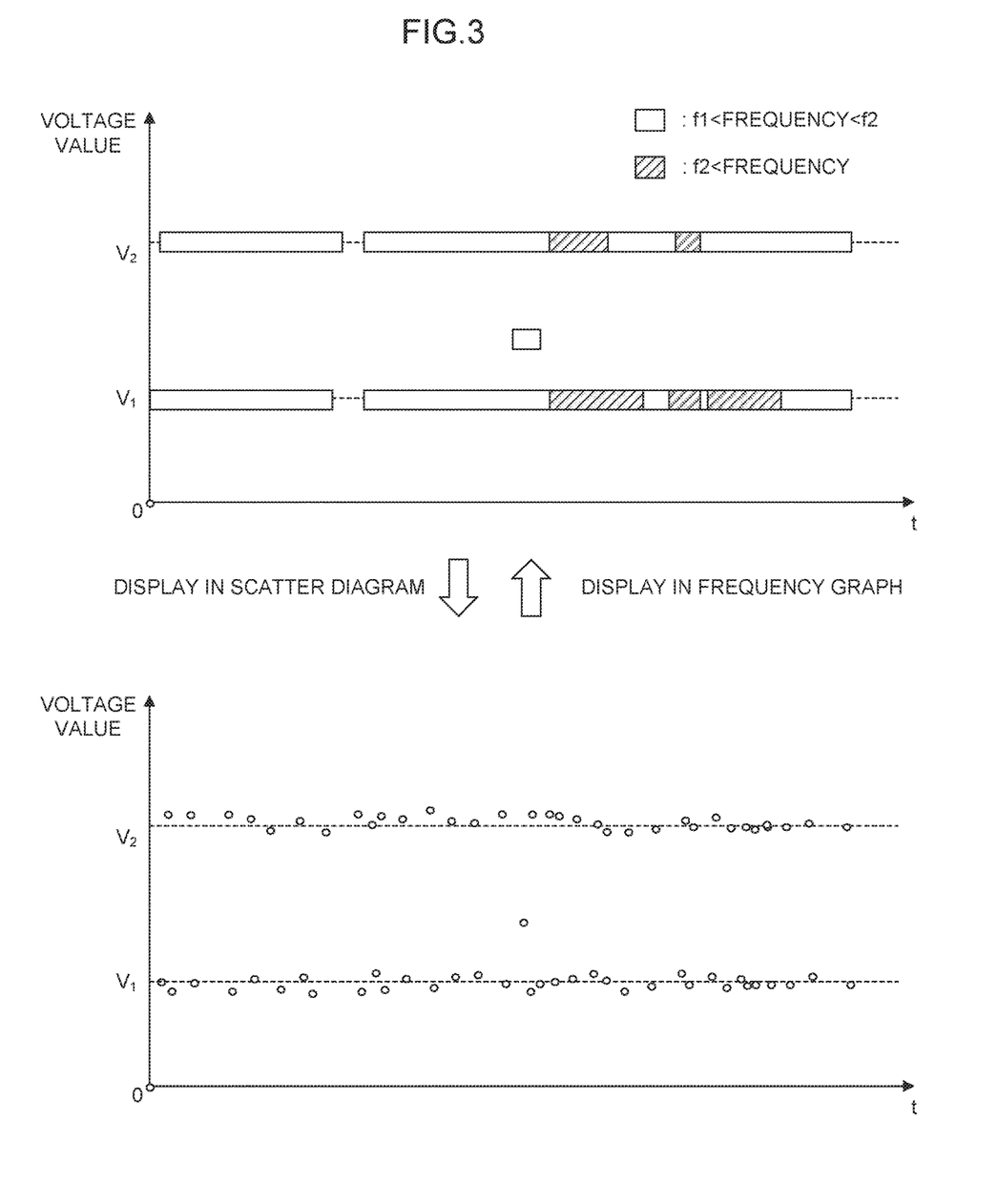
FIG. 3 is a diagram of examples of general display and detailed display.

FIG. 3 is a diagram of an example of general display displayed based on the general display data generated by the general display generation unit 112 and detailed display displayed based on the detailed display data generated by the detailed display generation unit 114. The general display depicted on an upper side of FIG. 3 depicts an example in which the general display generation unit 112 displays the calculated frequency in graph from. Also, the detailed display depicted on a lower side of FIG. 3 depicts an example in which the detailed display generation unit 114 displays each data value configuring the time series data in a scatter diagram. In the frequency graph exemplarily depicted in FIG. 3, the frequency of each data value at each time is displayed with a different color and a different brightness (in the drawing, a frame and a hatched frame), in accordance with the magnitude of frequency. Also, when the frequency or density exceeds a predetermined threshold, a special visual effect (such as a predetermined color, blinking display, and reversed display) may be used for display so that that excess can be grasped. In this manner, the time series data is represented with a visual effect using, for example, a color in accordance with the frequency of each data value at each time. With this, compared with display in a line graph depicted in FIG. 10, it becomes possible to grasp at a glance that the data has data values acquired in a plurality of different modes. Other examples of the visual effect include display by a character string and display by changing the type of an icon, size, font, animation, and so forth. Also, an isolated frame at the center in the frequency graph of FIG. 3 indicates that there is an outlier not belonging to any mode. In this manner, in the display in a frequency graph by the present scheme, compared with display in a line graph depicted in FIG. 10, an outlier or the like is prevented from being hidden behind a line to become ungraspable.

A problem occurs when the above-described time series data is displayed in a line graph. Specifically, particularly in the field of industrial machines, time series data of a predetermined physical quantity detected by a sensor on a machine is handled. Thus, by the setting error, the arrangement of a production system, limitations of sensor specifications, and so forth, there is a tendency for the time series data to be split into data acquired in a plurality of different modes. Thus, the time series data display device 1 according to the present embodiment has a remarkable effect in display of time series data acquired particularly from an industrial machine.

In the time series data display device 1 according to the embodiment described above, for each piece of data configuring time series data, general display using frequencies is provided to the operator. Thus, when the data values are split into a plurality of modes, the operator can grasp a situation of separation to each mode in a visualized state. Also, even if the data acquired over a long period of time is unbalanced in time, the data can be appropriately grasped by taking a position where the frequency is changed as a change point.

As one modification example of the time series data display device 1 according to the present embodiment, in place of the frequency $f_{ij}$ of the predetermined value $x_j$ at the predetermined time $t_i$, the general display generation unit 112 may calculate another statistical value indicating a distribution state of data near the predetermined value $x_j$ at the predetermined time $t_i$ and generate general display data based on the calculated statistical value. For example, the general display generation unit 112 may calculate a probability density regarding the presence of data at the predetermined time $t_i$ and the predetermined value $x_j$ and generate a distribution graph of the calculated probability density as general display data.

As another modification example of the time series data display device 1 according to the present embodiment, in place of general display with a different color or a different brightness, the general display generation unit 112 may represent general display in a three-dimensional bar chart or the like. When display is made in this display mode, while cost is incurred for three-dimensional display processing, a distribution chart in which differences in frequency and density are finely represented by the height of a bar chart can be provided to the operator.

As still another modification example of the time series data display device 1 according to the present embodiment, when generating general display data, the general display generation unit 112 may normalize the time series data so that the minimum value is 0 and the maximum value is 1. In this case, display in frequency and density is performed for the normalized time series data. Also, when the time series data is normalized, in calculation of frequency and density, the range of data values may be divided into ranges of, for example, 0 to 0.2, 0.2 to 0.4, . . . , and 0.8 to 1.0 to calculate frequency or density in each range.

Note that the above-described display schemes for general display may be each implemented and be switchable as appropriate in accordance with the input from the input device 71 by the operator.

Figure 4:
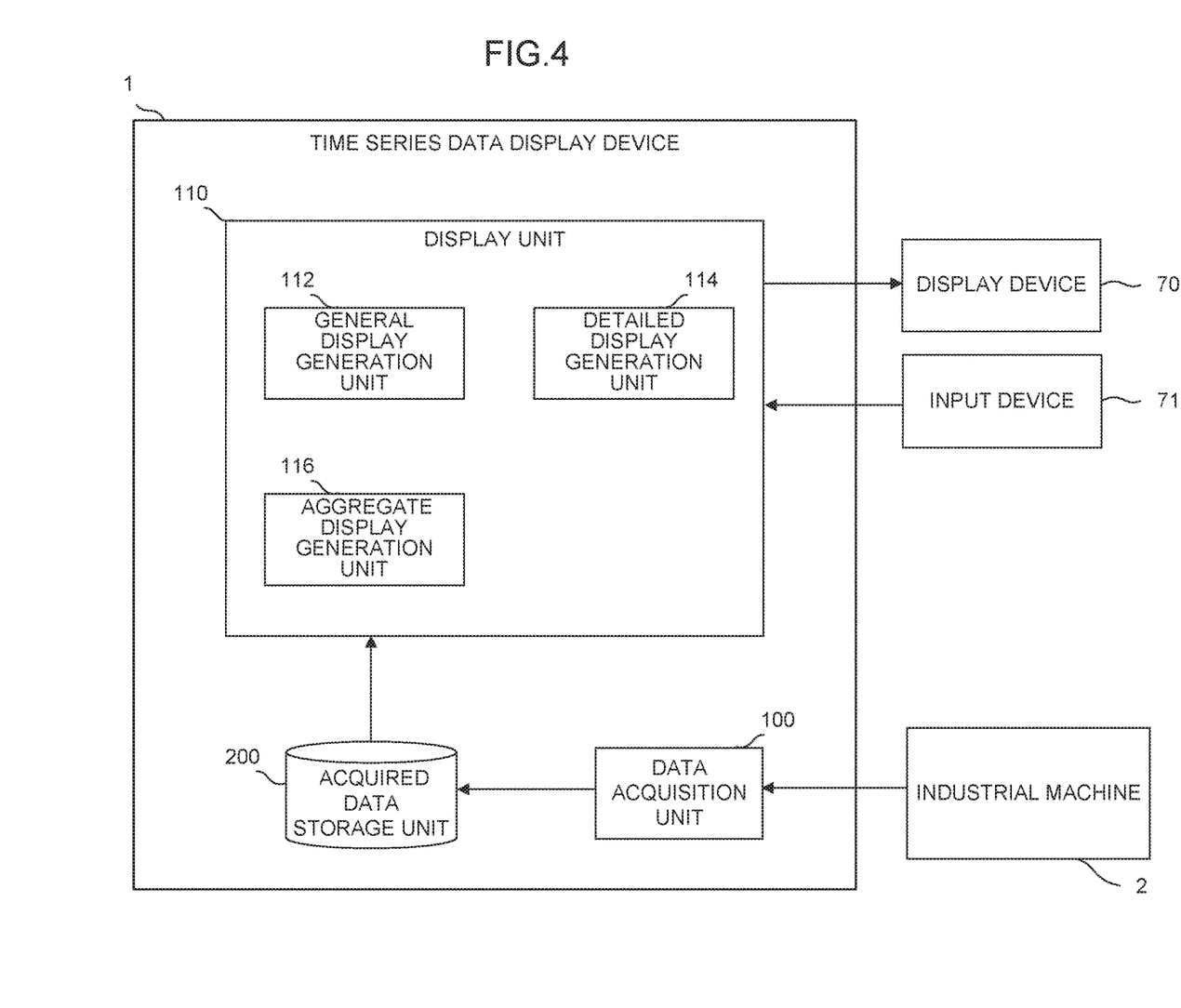
FIG. 4 is a schematic functional block diagram of a time series data display device according to a second embodiment.

FIG. 4 is a schematic functional block diagram of a time series data display device 1 according to a second embodiment of the present invention. Each function of the functional blocks depicted in FIG. 4 is achieved by the CPU 11 included in the time series data display device 1 depicted in FIG. 1 executing a system program to control the operation of each unit of the time series data display device 1.

In addition to each unit described in the first embodiment, the time series data display device 1 of the present embodiment further includes an aggregate display generation unit 116.

For a plurality of pieces of time series data included in the acquired data, the aggregate display generation unit 116 generates aggregate display data for aggregate display in which the distribution tendencies of the respective pieces of time series data are aggregated onto one display. As an example of aggregate display, a display scheme can be thought in which characteristic data values (data values with the highest frequency or density) of the respective pieces of time series data at each time can be grasped on one display. As another example, a display scheme can be thought in which an average value or median value of the respective pieces of time series data themselves at each time can be grasped on one display.

Figure 5:
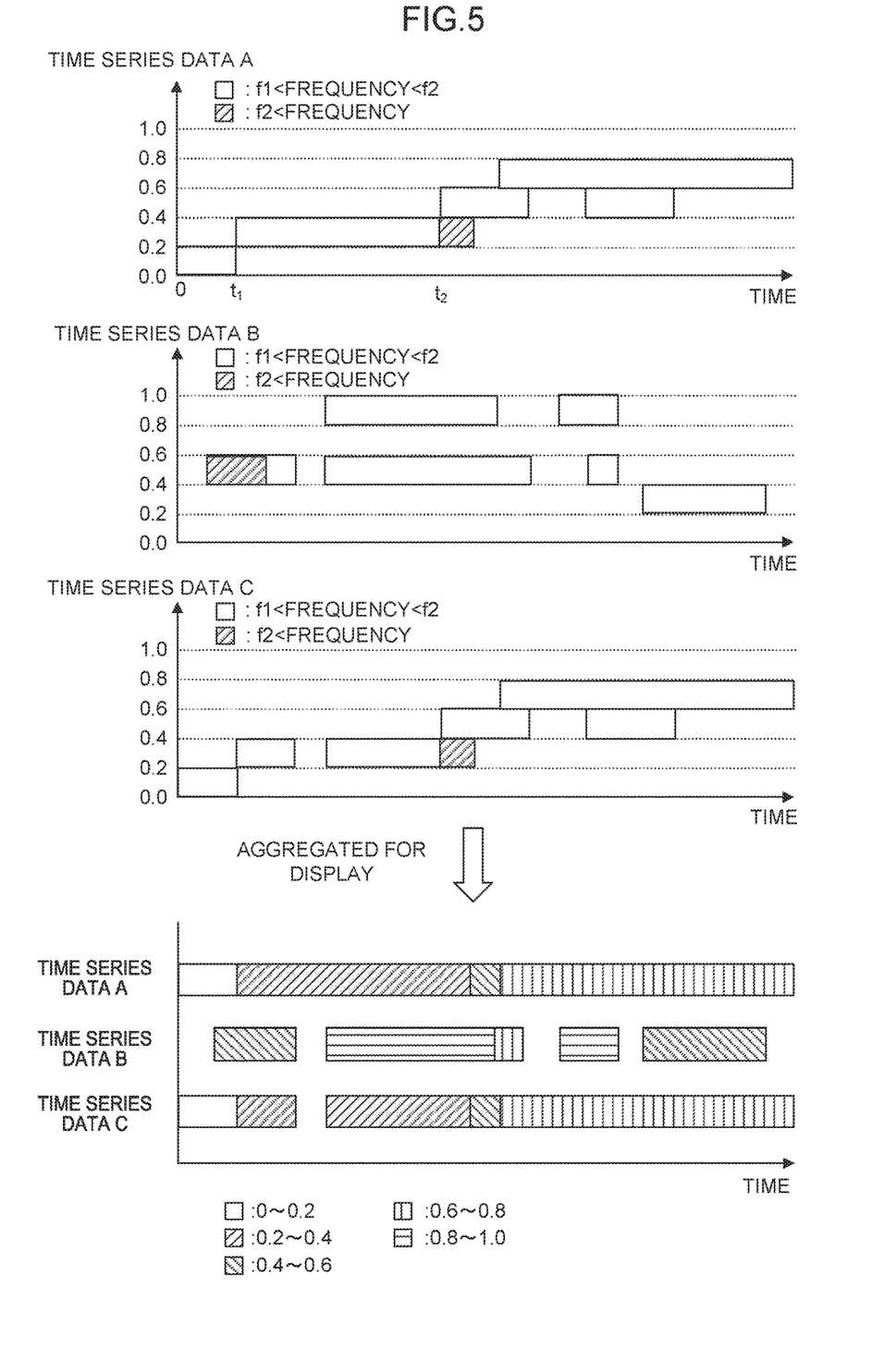
FIG. 5 is a diagram of an example of aggregate display.

FIG. 5 is a diagram of an example of general display displayed based on general display data regarding a plurality of pieces of time series data generated by the general display generation unit 112 and an example of aggregate display displayed based on aggregate display data generated by the aggregate display generation unit 116 for these plurality of pieces of time series data. Three general displays depicted on an upper side of FIG. 5 are an example in which normalization is performed by the general display generation unit 112 so that the data value of each piece of time series data takes values from 0.0 to 1.0 and the frequency of each piece of data is displayed in a graph. The aggregate display depicted on a lower side of FIG. 5 is an example in which, for each piece of time series data, data values with high frequency at each time are color-coded for display. For example, for time series data A, the data value is often in a range of 0.0 to 0.2 at a time 0 until a time $t_1$, and the data value is often in a range of 0.2 to 0.4 at the time $t_1$ until a time $t_2$. Thus, in aggregate display, the range of the time series data A from the times 0 to $t_1$ is displayed with a color (hollow frame in FIG. 5) indicating 0 to 0.2, and the range from the times $t_1$ to $t_2$ is displayed with a color (frame hatched diagonally downward to the left in FIG. 5) indicating 0.2 to 0.4. This display allows a change in time of the plurality of pieces of time series data to be aggregated into one diagram for display. Also, unlike display in a line graph, displays of the respective pieces of time series data do not overlap, and thus the distribution of the time series data as a whole can be easily grasped. Furthermore, where the change point of the distribution is in each piece of time series data can be grasped at a glance, and a temporal relation among the change points of the respective pieces of time series data can also be checked.

Figure 6:
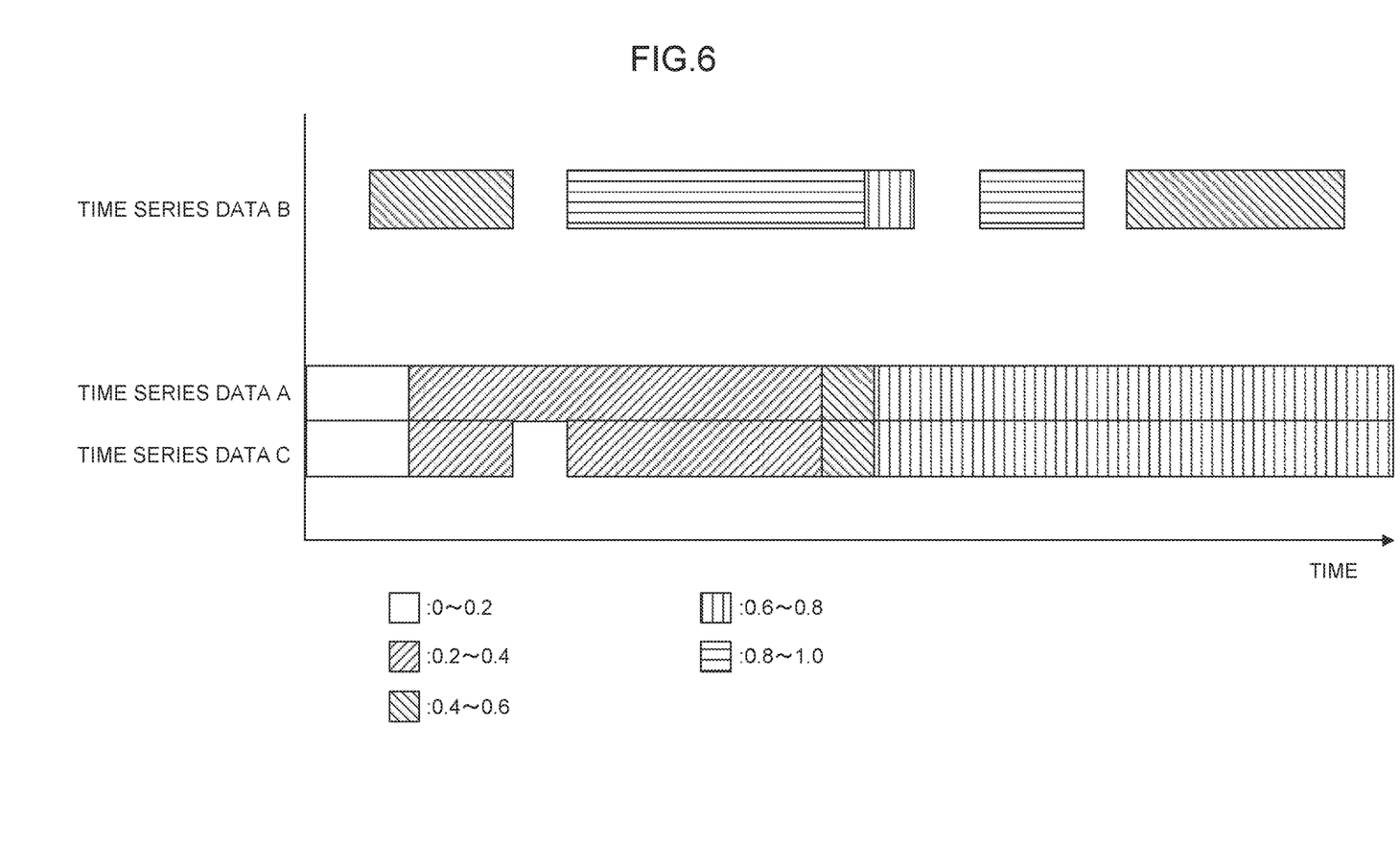
FIG. 6 is a diagram of another example of the aggregate display.

Note in the example of FIG. 5 that tendencies of temporal changes of the time series data A and time series data C are quite similar to each other. In this case, the aggregate display generation unit 116 may generate aggregate display data so that, for example, as exemplarily depicted in FIG. 6, pieces of time series data with a similar transition of the frequency distribution are displayed alongside.

Also, in aggregate display, when the value of data with the highest frequency or density in each piece of time series data at each time exceeds a predetermined threshold, a special visual effect (such as a predetermined color, blinking display, and reversed display) may be used for display so that that excess can be grasped.

In the field of industrial machines, it is often the case that the operation status of the industrial machine is required to be comprehensively determined from the values of a plurality of pieces of time series data detected by a plurality of sensors. The time series data display device 1 according to the present embodiment can provide distributions of frequency or the like of data values of time series data acquired from a plurality of sensors as being aggregated on one display. Thus, the time series data display device 1 according to the present embodiment has a remarkable effect in display of time series data acquired particularly from an industrial machine. Note that the time series data may be one or more pieces of sensor data acquired from an industrial machine via a communication network.

Figure 7:
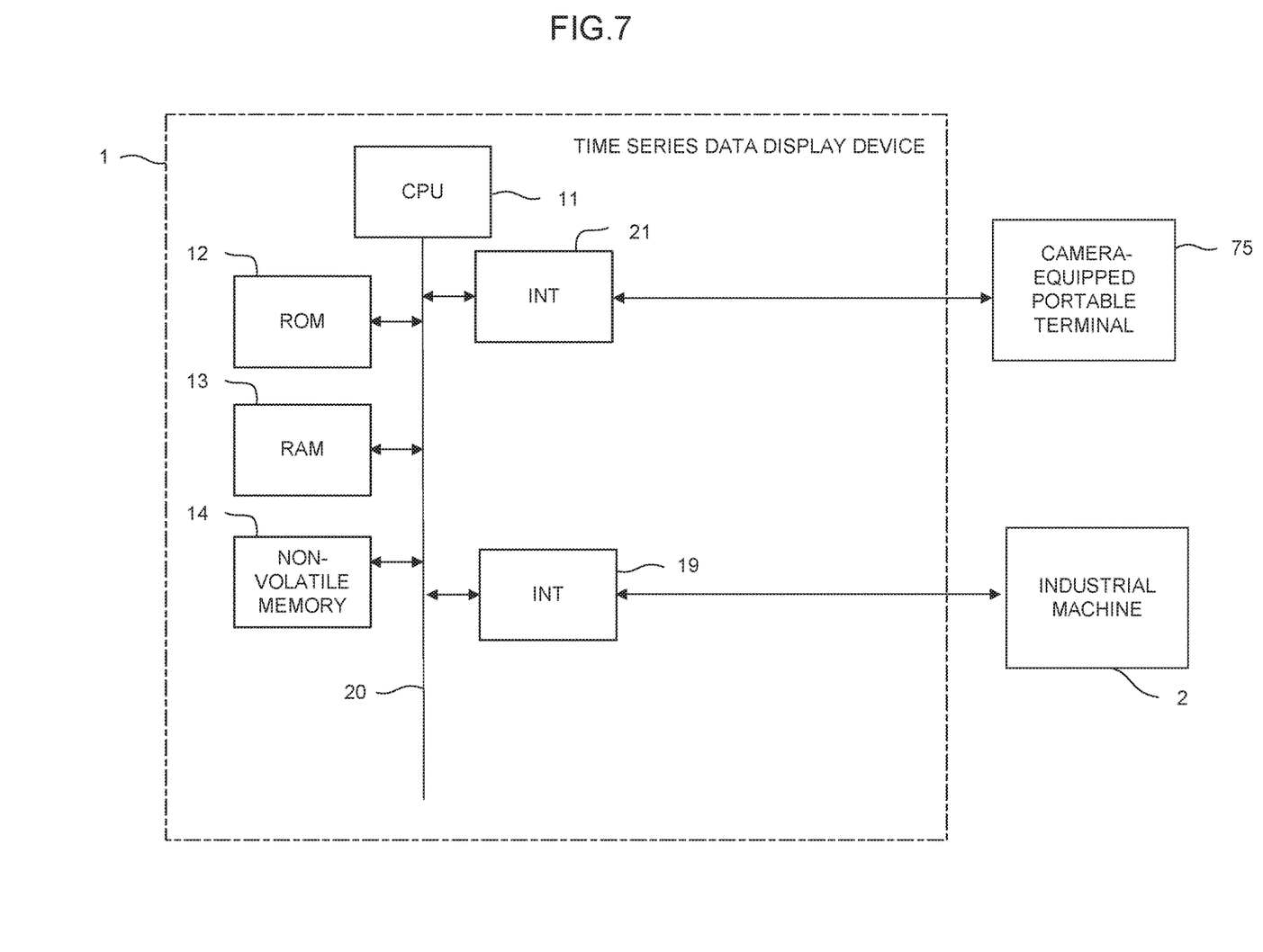
FIG. 7 is a schematic diagram of a hardware structure of a time series data display device according to a third embodiment.

FIG. 7 is a schematic diagram of a hardware structure of a time series data display device 1 according to a third embodiment of the present invention. The time series data display device 1 according to the present embodiment exchanges inputs and outputs for data display with a known camera-equipped portable terminal 75 carried by the operator. Also, the time series data display device 1 accepts an input from the operator through the camera-equipped portable terminal 75. The camera-equipped portable terminal 75 may be configured as, for example, a so-called tablet terminal or slate terminal. Also, the camera-equipped portable terminal 75 may be configured as, for example, a head mount display (HMD). The camera-equipped portable terminal 75 includes, for example, a liquid-crystal display as a display device, and also includes a keyboard, touch panel, or a touch pad as an input device.

The camera-equipped portable terminal 75 is provided with an imaging device such as a camera. The camera-equipped portable terminal 75 includes a function of acquiring an image of reality taken by the camera and displaying the image on the display device. Also, the camera-equipped portable terminal 75 includes a function of, when a predetermined graphic (for example, two-dimensional code) is detected in the image of reality taken by the camera, transmitting information about that graphic and the coordinate positions of that graphic in the image to the time series data display device 1. Meanwhile, the camera-equipped portable terminal 75 can display an image transmitted from the time series data display device 1 via an interface 21 as being superposed on the image of reality taken by the camera at a predetermined position on the display device. The predetermined position on the display device where the image sent from the camera-equipped portable terminal 75 is displayed may be a fixed position on the display device set at the time series data display device 1 or the camera-equipped portable terminal 75. Alternatively, the predetermined position on the display device where the image sent from the camera-equipped portable terminal 75 is displayed may be a position where a predetermined graphic (for example, two-dimensional code) detected in the image of reality taken by the camera is detected. Since the functions of superposing display of a predetermined image with the image of the real world taken by the camera-equipped portable terminal 75 have been known as augmented reality (AR) technology, detailed description is omitted in the specification.

Figure 8:
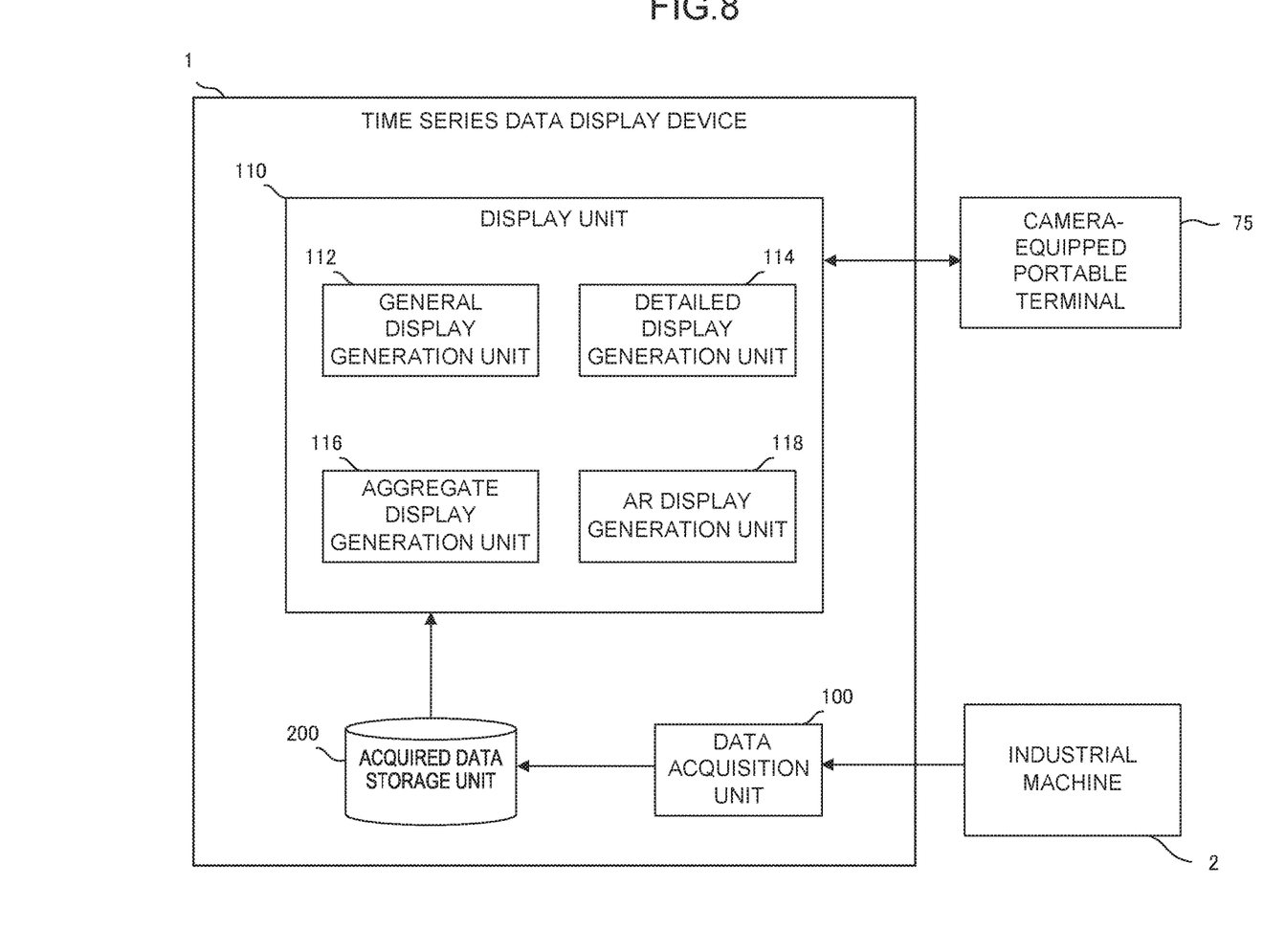
FIG. 8 is a schematic functional block diagram of a time series data display device according to the third embodiment.

FIG. 8 is a schematic functional block diagram of the time series data display device 1 according to the third embodiment of the present invention. Each function of the functional blocks depicted in FIG. 8 is achieved by the CPU 11 included in the time series data display device 1 depicted in FIG. 7 executing a system program to control the operation of each unit of the time series data display device 1.

The time series data display device 1 according to the present embodiment further includes an AR display generation unit 118 that generates AR display data for superposing at least either one of general display data and aggregate display data with an image taken by the camera on the camera-equipped portable terminal 75. The AR display generation unit 118 instructs the general display generation unit 112 or the aggregate display generation unit 116 to generate general display data or aggregate display data for time series data related to a predetermined graphic transmitted from the camera-equipped portable terminal 75. The AR display generation unit 118 generates AR display data for superposing display of the generated general display data or aggregate display data at the position of the graphic detected in the image taken by the camera, and transmits the generated AR display data to the camera-equipped portable terminal 75.

Figure 9:
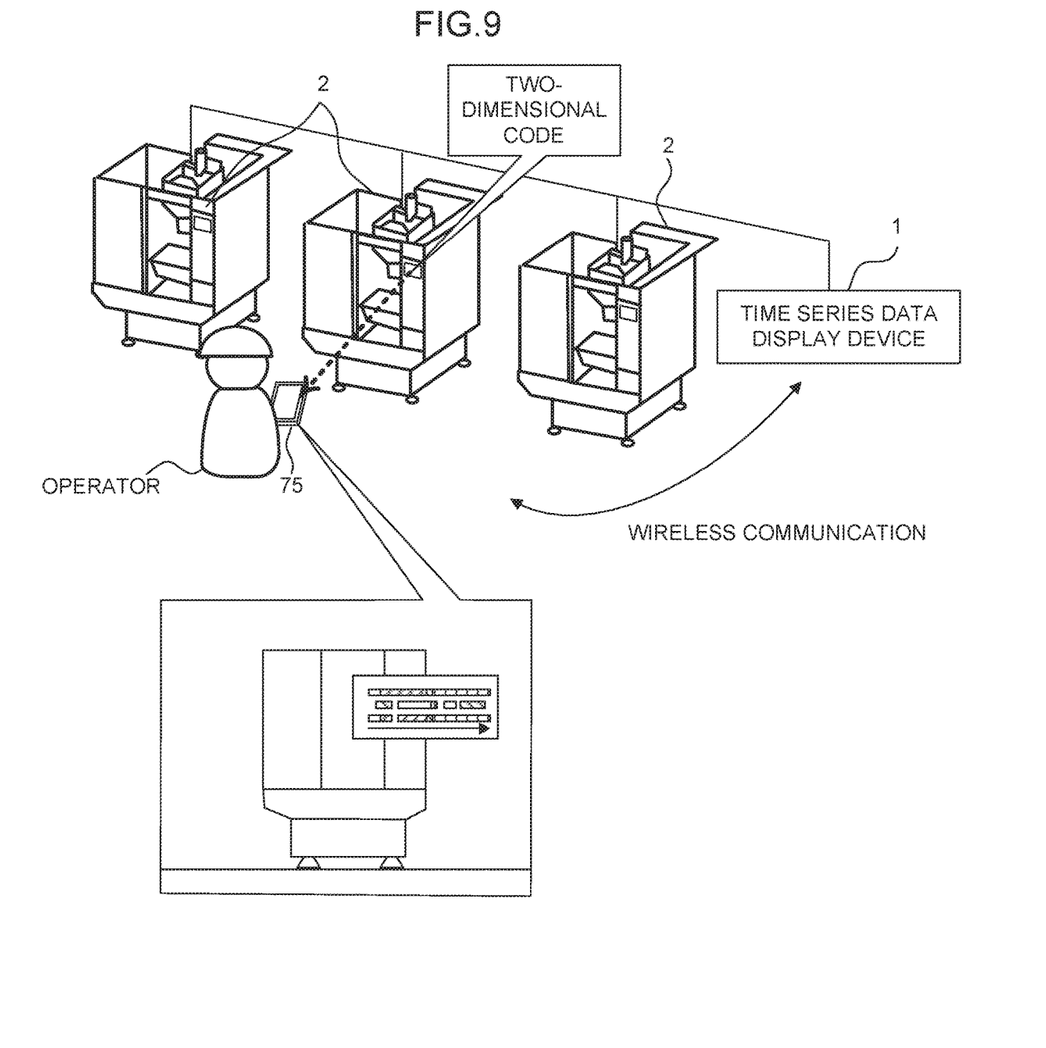
FIG. 9 is a diagram of an example of AR display.

FIG. 9 depicts an example in which the time series data display device 1 according to the present embodiment is applied to a task of checking an operating status of each industrial machine 2 by the operator. In FIG. 9, the time series data display device 1 is connected to a plurality of industrial machines 2 as checkup targets via a wired network. The time series data display device 1 can acquire time series data regarding operation of each industrial machine 2. Also, each industrial machine 2 has affixed thereto a sheet having an encoded two-dimensional code printed thereon, with a number uniquely identifying the industrial machine 2 and the type of time series data to be referred to by the operator during checkup. The operator carries the camera-equipped portable terminal 75 connected to the time series data display device 1 via a wireless network.

In the situation depicted in FIG. 9, when conducting a checkup, the operator stands in front of each industrial machine 2, and has the camera of the camera-equipped portable terminal 75 oriented toward the industrial machine 2 to display a captured image of the industrial machine 2 and the two-dimensional barcode on the display device. When detecting the two-dimensional barcode in the image taken by the camera, the camera-equipped portable terminal 75 analyzes the two-dimensional barcode to decode the identification number of the industrial machine 2 and the type of time series data to be referred to for transmission to the time series data display device 1. Based on the received identification number of the industrial machine 2 and type of time series data to be referred to, the time series data display device 1 selects time series data as a display target from the data stored in the acquired data storage unit 200. The time series data display device 1 generates general display data and aggregate display data for the selected time series data. Based on the generated general display data and aggregate display data, the time series data display device 1 generates AR display data for superposing display on the camera image, and transmits the generated AR display data to the camera-equipped portable terminal 75. The camera-equipped portable terminal 75 superposes and displays the received AR display data at the position of the two-dimensional code of the camera image.

The above-described display method by AR is not required to be performed for each industrial machine 2. For example, it may be configured such that two-dimensional code is affixed near each sensor and, when an image of the sensor is taken by the camera-equipped portable terminal 75 together with the two-dimensional code, general display of the time series data detected by the sensor is superposed on the image of the sensor for display on the camera-equipped portable terminal 75.

In addition to the checkup task, the present embodiment can be applied also to, for example, quality inspection of products conveyed on a belt conveyer. For example, in a situation in which products of a plurality of types are conveyed on the belt conveyer, two-dimensional code is provided in advance to a measurement instrument for measuring the weight of a product, and general display of time series data about the measurement results is superposed on the image of the measurement instrument and displayed on the camera-equipped portable terminal 75. With this, intrusion of a product other than products of the plurality of types assumed to be conveyed on the belt conveyer (such as a defective product or another product conveyed due to an error by the operator) can also be easily grasped.

According to the above-described embodiments, the operator can view, together with the industrial machine 2, the time series data regarding the operating status of the industrial machine 2 as color-coded display with the distribution of frequency, display in a three-dimensional bar chart, or the like. As a result, the situation regarding operation of the industrial machine 2, an image of which has been taken by the camera, can be intuitively grasped.

While the embodiments of the present invention have been described above, the present invention is not limited to the examples of the embodiments described above and can be carried out in other ways by being modified as appropriate.

While the example of displaying time series data acquired from an industrial machine is described in the above embodiments, the present invention can be used also in display of time series data handled in other technical fields.

The invention claimed is:

1. A time series data display device that displays time series data in an industrial machine, the time series data display device comprising:
a display unit that outputs display data regarding the time series data, wherein the display unit includes:
a general display generation unit that generates general display data for general display of a general tendency of the time series data, and
a detailed display generation unit that generates detailed display data for detailed display of respective individual values of the time series data, the individual values referring to a value of the detected data acquired from a sensor provided to the industrial machine, the detailed display data being a scatter diagram specifying the individual values, wherein the detected data in the industrial machine includes at least one of position, speed, and acceleration of an axis, and current values, voltage values, and torque values of a motor of the industrial machine,
the general display generation unit uses a statistical calculation to provide a general display containing a frequency distribution for a number of pieces of individual data configuring the time series data at each position of the time series data on a rendering plane, the frequency referring to a number of pieces of data included in a predetermined duration and in a predetermined data value range,
wherein the general display generation unit provides the general display with a different visual effect from each other in accordance with the frequency distribution,
wherein the frequency of the number of pieces of data in the predetermined data value range exceeding a predetermined threshold is displayed with the different visual effect, and
wherein an operator switches a display mode of the display unit between the general display and the detailed display for display on the time series data display device to view the output of the time series data and provide an operation status of the industrial machine.

2. The time series data display device according to claim 1, wherein
the time series data is one or more pieces of sensor data acquired from the industrial machine via a communication network.

3. The time series data display device according to claim 1, wherein
the display unit further includes an AR display generation unit that generates AR display data for superposing the general display on an image of reality.

4. The time series data display device according to claim 1, wherein
the visual effect represents the frequency with color, brightness, or height.

5. The time series data display device according to claim 1, wherein
the detailed display is a scatter diagram of the individual data configuring the time series data or a list display of the individual configuring the time series data.

6. The time series data display device according to claim 1, wherein
the display unit further includes an aggregate display generation unit that generates aggregate display data for aggregate display of the general display regarding a plurality of pieces of the time series data.

7. The time series data display device according to claim 6, wherein
the aggregate display displays, for the plurality of pieces of the time series data, data values with high frequency or density at each time, or an average value or a median value of the data values themselves at each time, with a visual effect.

8. The time series data display device according to claim 6, wherein
the aggregate display displays time series data exhibiting a similar change tendency of frequency or density alongside, among the plurality of pieces of the time series data.

9. The time series data display device according to claim 6, wherein
the aggregate display displays data with frequency or density exceeding a predetermined threshold, with a visual effect different from other visual effects.

10. The time series data display device according to claim 1, wherein the industrial machine is a machine tool.

* * * * *